United States Patent [19]
Kimura et al.

[11] Patent Number: 5,567,403
[45] Date of Patent: Oct. 22, 1996

[54] PARTICLES OF RARE EARTH PHOSPHATE AND METHOD FOR THE PREPARATION THEREOF

[75] Inventors: Yuji Kimura; Shigeru Sakai, both of Fukui-ken, Japan

[73] Assignee: Shin-Etsu Chemical Co., Ltd., Tokyo, Japan

[21] Appl. No.: 453,400

[22] Filed: May 30, 1995

[30] Foreign Application Priority Data

May 30, 1994 [JP] Japan .................................. 6-139442

[51] Int. Cl.$^6$ .................................................. C01F 17/00
[52] U.S. Cl. .................................... 423/263; 252/301.4 P
[58] Field of Search ...................... 252/301.4 P; 423/263

[56] References Cited

U.S. PATENT DOCUMENTS 5,340,556  8/1994  Collin et al. ...................... 252/301.4 P

FOREIGN PATENT DOCUMENTS 0489689  8/1992  European Pat. Off. .
0581621  2/1994  European Pat. Off. .
0581622  2/1994  European Pat. Off. .

*Primary Examiner*—Wayne Langel
*Attorney, Agent, or Firm*—Wenderoth, Lind & Ponack

[57] ABSTRACT

Proposed is a method for the preparation of a rare earth phosphate powder or, in particular, a composite rare earth phosphate powder of lanthanum, cerium and terbium having properties suitable for use as a base material of phosphors in fluorescent lamps in respect of particle size distribution of 1–10 μm and globular particle configuration. The method is basically a precipitation method by mixing aqueous solutions of a water-soluble salt of the rare earth element or elements and phosphoric acid but the inventive method is characterized by completing introduction of the rare earth salt solution into the phosphoric acid solution within a limited length of time of 3 seconds to 5 minutes at a specified temperature, each of the solutions having a specified concentration.

4 Claims, 2 Drawing Sheets

PARTICLES OF RARE EARTH PHOSPHATE AND METHOD FOR THE PREPARATION THEREOF

BACKGROUND OF THE INVENTION

The present invention relates to particles of a rare earth phosphate having usefulness as a base material of rare earth phosphate-based phosphors mainly used in fluorescent lamps as well as a method for the preparation thereof. More particularly, the invention relates to phosphate particles of lanthanum, cerium and terbium in combination and a method for the preparation thereof.

As is well known by the disclosure, for example, in U.S. Pat. No. 3,634,282 and Japanese Patent Kokai No. 54-56086, lanthanum orthophosphate activated by cerium and terbium having a monoclinic crystal structure is useful as a phosphor in fluorescent lamps of the 3-wavelength type. This phosphor material is usually prepared from composite phosphate particles of lanthanum, cerium and terbium in combination, for which several wet-process methods have been proposed heretofore, for example, in Japanese Patent Publication No. 1-41673, Japanese Patent Kokai No. 4-388105, U.S. Pat. No. 3,507,804 and Japanese Patent Kokai No. 6-56412. The rare earth phosphate products prepared by the methods disclosed in the former two references, however, are disadvantageous due to the relatively high production costs because the phosphate particles obtained thereby consist of primary particles having a very small particle diameter smaller than 1 μm so that the precipitates of the phosphate formed by the wet process are consolidated into hard cakes in the course of filtration and drying necessitating a pulverization or disintegration treatment before use as a base material of rare earth phosphate phosphors. On the other hand, the rare earth phosphate particles prepared by the method disclosed in the above mentioned third reference have a particle diameter as large as 10 μm or even larger so that the phosphor prepared from such phosphate particles having a particle diameter of 10 μm or larger is not suitable for use in fluorescent lamps for which the phosphor particles preferably should have a particle diameter of 1 to 10 μm although such a phosphor consisting of so coarse particles can be used in cathode ray tubes. Further, the rare earth phosphate powder obtained by the method disclosed in the above mentioned fourth reference consists of particles having a particle diameter of 1 to 15 μm but the particles are each an agglomerate of very fine primary particles having a particle diameter smaller than several hundreds of nm.

As is mentioned above, phosphors in general preferably consist of non-agglomerated discrete particles having a particle diameter of 1 to 10 μm. Primary particles of a rare earth phosphate-based phosphor having a particle diameter smaller than the above mentioned range have a problem that the brightness of the phosphor as a luminescent material on the walls of fluorescent lamps is subject to decay in the lapse of time during service. When the phosphor particles have a relatively large particle diameter but consist of agglomerates of fine primary particles, on the other hand, the agglomerate particles are necessarily disintegrated during handling to produce fine dusty particles so that the yield of acceptable phosphor products is decreased greatly. Furthermore, the agglomerate particles obtained by the method disclosed in the above mentioned fourth reference have an irregular particle configuration so that difficulties are encountered that coating on the inner surface of a fluorescent lamp tube with a slurried coating composition of the phosphor can hardly be uniform enough when the phosphor material is a mixture of phosphor materials of different types as is the case in the phosphor composition for fluorescent lamps of the 3-wavelength type as compared with a coating composition of a phosphor material consisting of spherical or globular particles. In this fourth method for the preparation of a rare earth phosphate, namely, it is essential that the pH value of the reaction mixture during the precipitation reaction is kept constant by the addition of ammonia water or an alkali metal hydroxide sometimes in an amount of three times by moles based on the amount of the rare earth element so that serious problems are encountered relative to the production costs and in the environmental pollution relative to waste water disposal. An alternative method is proposed in Japanese Patent Kokai No. 4-130014 for the preparation of rare earth phosphate particles as a base material of phosphors having a particle diameter of 1 to 10 μm, in which an aqueous slurry of fine particles of a rare earth phosphate is dried by using a spray drier. This method of spray drying is also not free from the problem, like the other methods described above, that the particles are formed by agglomeration of fine primary particles of sub-micron order to form agglomerated particles of 1 to 10 μm diameter which have low mechanical strengths and are readily disintegrated so that the workability in the processing thereof into a phosphor is poor and the yield of acceptable phosphor products is necessarily low.

SUMMARY OF THE INVENTION

The present invention accordingly has an object to provide a powder consisting of particles of a rare earth phosphate or, in particular, particles of a composite phosphate of rare earth elements including lanthanum, cerium and terbium in combination free from the above described problems and disadvantages in the rare earth phosphate particles of prior arts as well as to provide an efficient and reliable method for the preparation of a rare earth phosphate powder having such unique characteristics.

Thus, the rare earth phosphate powder provided by the invention is a powder consisting of particles of a rare earth element phosphate having a globular particle configuration and an average particle diameter in the range from 1 μm to 10 μm or, in particular, a powder consisting of particles of phosphate of a combination of rare earth elements including lanthanum, cerium and terbium expressed by the formula $La_xCe_yTb_{(1-x-y)}PO_4 \cdot zH_2O$, in which x is a positive number in the range from 0.4 to 0.7, y is zero or a positive number with the proviso that x+y is in the range from 0.7 to 0.9 and z is zero or a positive integer not exceeding 5, having a globular particle configuration and an average particle diameter in the range from 1 μm to 10 μm.

The method of the present invention for the preparation of a rare earth phosphate powder having the above defined unique characteristics of the particles comprises the steps of:

(a) adding an aqueous solution of a salt of a rare earth element or, in particular, an aqueous solution of salts of lanthanum, cerium and terbium in combination into an aqueous solution of phosphoric acid taking a time of the length in the range from 3 seconds to 5 minutes to form an aqueous slurry of particles of a rare earth phosphate or, in particular, particles of composite rare earth phosphates of lanthanum, cerium and terbium in combination in an aqueous medium; and (b) separating the particles in the aqueous slurry from the aqueous medium.

DETAILED DESCRIPTION OF THE PREFERRED EMBODIMENTS

Figure 1:
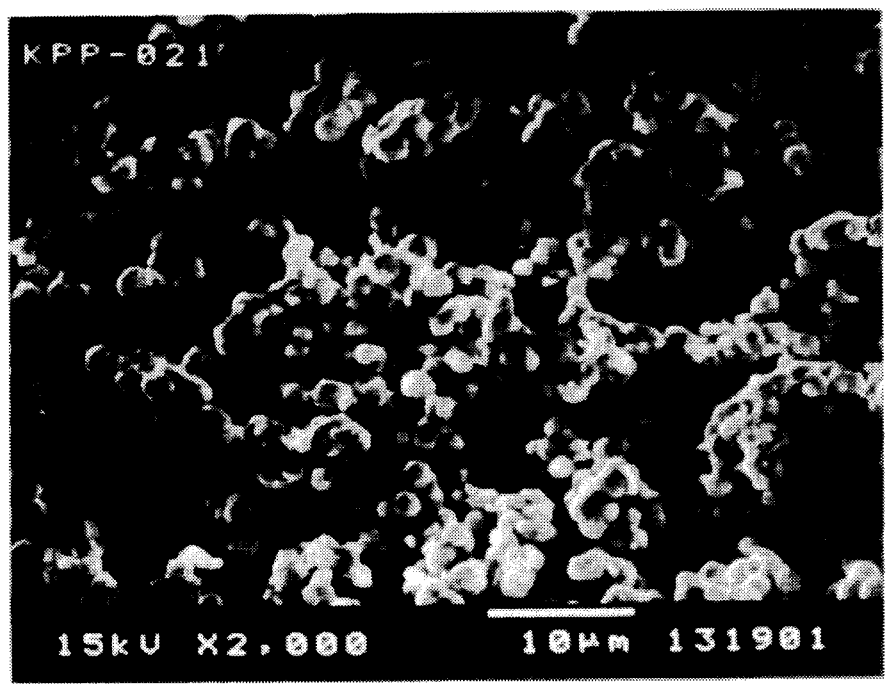
FIGS. 1 and 2 are each a scanning electron microscopic photograph of the globular particles of a composite rare earth phosphate of lanthanum, cerium and terbium prepared in Example 1 and in Comparative Example 2, respectively.
Figure 2:
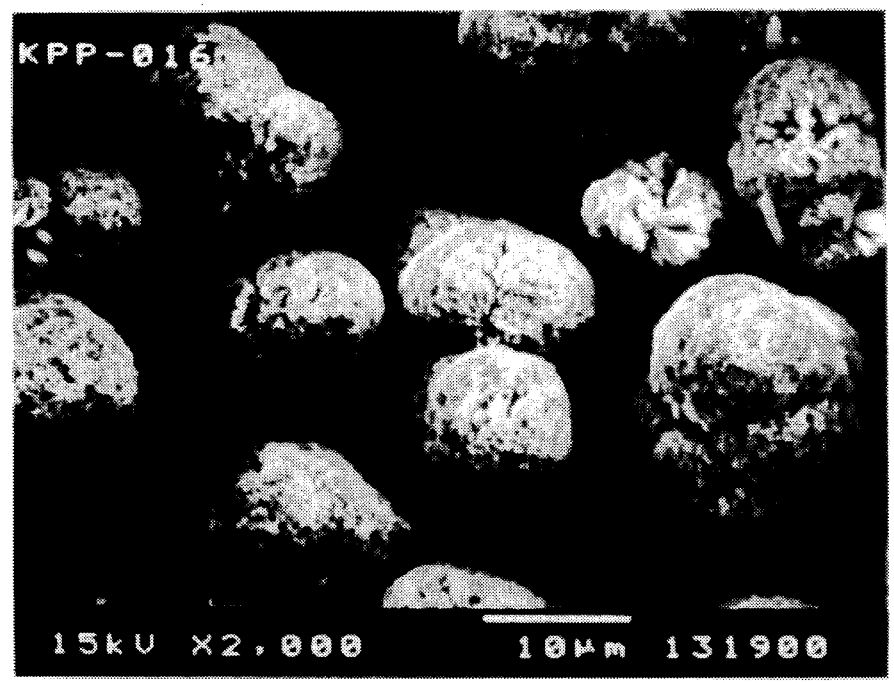
Figure 3:
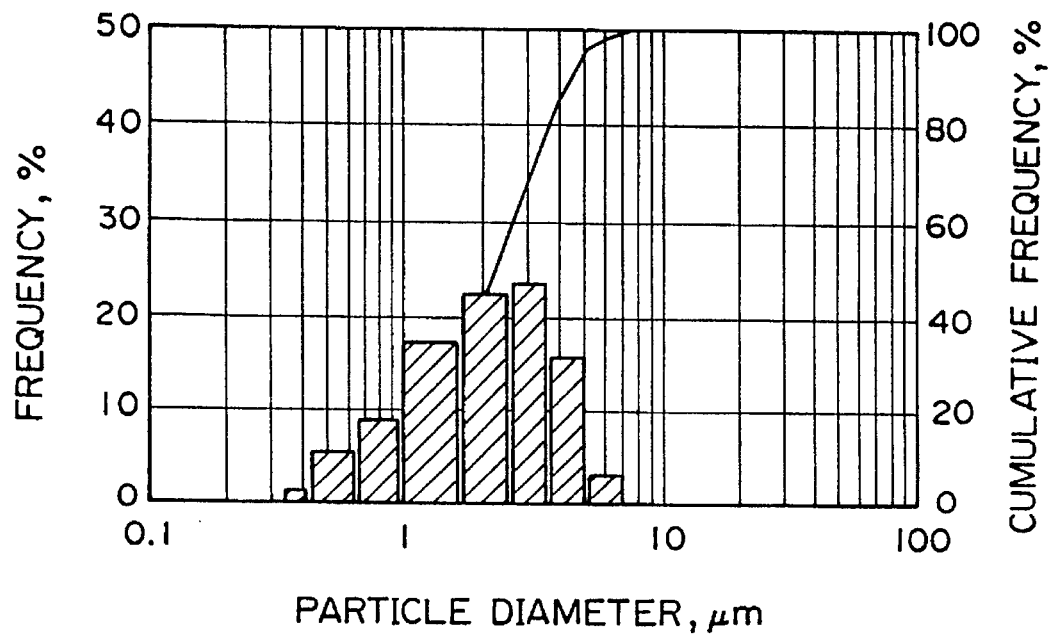
FIGS. 3 and 4 are each a histogram showing the particle size distribution of the globular particles of a composite rare earth phosphate of lanthanum, cerium and terbium prepared in Example 1 and in Comparative Example 2, respectively.
Figure 4:
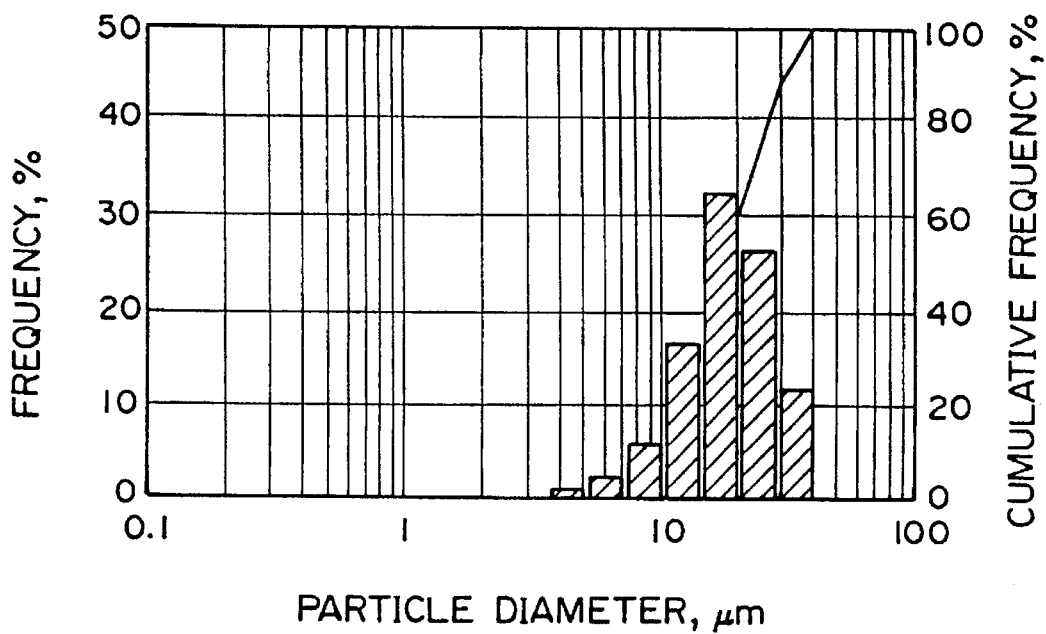

As is described above, the rare earth phosphate powder of the invention is characterized by the unique globular particle configuration and particle size distribution of the discrete particles not obtained in the conventional rare earth phosphate powders and has been obtained as a result of the extensive investigations undertaken by the inventors. The above mentioned unique characteristics of the inventive rare earth phosphate powder are evident from the scanning electron microscopic photograph of FIG. 1 showing the inventive particles of the composite rare earth phosphate of lanthanum, cerium and terbium prepared in Example 1 described later, which is in great contrast to FIG. 2 for the particles of the composite rare earth phosphate of lanthanum, cerium and terbium prepared for comparative purpose in Comparative Example 2 described later. The rare earth phosphate powder prepared in Example 1 has a particle size distribution shown by the histogram of FIG. 3 from which it is understood that the particle diameter of the powder falls within the range of 1 to 10 µm while the powder prepared in Comparative Example 2 has a coarser particle size distribution shown by the histogram of FIG. 4. The particle size distributions shown in FIGS. 3 and 4 were obtained by the measurement using a Microtrac Particle Size Analyzer Model No. 158705 (a commercial product by Microtrac Co.).

Following is a detailed description of the method for the preparation of the rare earth phosphate powder having the above mentioned characteristics.

One of the starting materials is an aqueous solution of a water-soluble salt of the rare earth element. The salt can be an inorganic acid salt such as chlorides, nitrates and the like. Such an aqueous solution of the salt can be prepared by dissolving an oxide of the rare earth element in an inorganic acid such as hydrochloric acid, nitric acid and the like. It is sometimes industrially advantageous in the costs, if available, to use the acidic aqueous solution obtained from the separation and purification process of the rare earth elements such as the solvent-extraction process. When the rare earth phosphate to be prepared is a composite phosphate of lanthanum, cerium and terbium in combination, acidic aqueous solutions of the respective rare earth salts are mixed together in a specified proportion and the aqueous solution is prepared to have an appropriate concentration of the rare earth element or elements, concentration of free acid and temperature. The concentration of the rare earth element or elements should be in the range from 0.01 mole/liter to 2 moles/liter or, preferably, from 0.05 mole/liter to 0.8 mole/liter. When the concentration of the rare earth element or elements is too low, too fine particles having a particle diameter of, for example, 0.5 µm or smaller are intermixed in the product of the rare earth phosphate particles while, when the concentration is too high, on the other hand, too coarse particles having a particle diameter exceeding, for example, 10 µm are intermixed in the product of the rare earth phosphate particles.

The molar concentration of free acid in the aqueous solution of the rare earth salt should not exceed three times of the molar concentration of the rare earth element or elements. When the concentration of free acid is too high, acicular particles are intermixed in the product of the rare earth phosphate particles. The aqueous solution of the rare earth salt should be kept at a temperature in the range from 50° C. to 100° C. When the temperature is too low, too fine particles having a particle diameter of, for example, 0.5 µm or smaller are intermixed in the product of the rare earth phosphate particles. Although the average particle diameter of the rare earth phosphate particles can fall within the range of 1 to 10 µm even when one or more of the above mentioned parameters do not fall within the above mentioned respective preferable ranges, all of the above mentioned requirements for the parameters should be satisfied by some means or others because deviation from the optimum conditions of the parameters may result in a decrease in the yield of the phosphor products prepared from the phosphate particles.

The other of the starting materials used in the inventive method is an aqueous solution of phosphoric acid. The amount of phosphoric acid in the aqueous solution is preferably at least 1.5 times of the theoretically equivalent amount relative to the rare earth element or elements in the first aqueous solution. When the amount of phosphoric acid is too small, too fine phosphate particles having a particle diameter of 0.5 µm or smaller are intermixed in the precipitates of the rare earth phosphate. The concentration of phosphoric acid in the aqueous solution is preferably in the range from 0.01 mole/liter to 5 moles/liter. When the concentration is too low, the volume of the aqueous solution is accordingly so large that the productivity of the process is decreased. When the concentration of phosphoric acid is too large, on the other hand, agglomeration of the primary particles may take place resulting in intermixing of coarse particles having a particle diameter exceeding 10 µm. The aqueous solution of phosphoric acid is kept at a temperature in the range from 50° C. to 100° C. It is preferable that the phosphoric acid solution is kept at about the same temperature as that of the aqueous solution of the rare earth salt. When the temperature of the phosphoric acid solution is too low, too fine particles having a particle diameter smaller than 0.5 µm may be intermixed in the precipitates of the rare earth phosphate. Although the average particle diameter of the rare earth phosphate particles can fall within the range of 1 to 10 µm even when one or more of the above mentioned parameters do not fall within the above mentioned respective preferable ranges, the above mentioned requirements for all of the parameters should be satisfied by some means or others because deviation from the optimum conditions of the parameters may result in a decrease in the yield of the phosphor products prepared from the phosphate particles.

In step (a) of the inventive method, the aqueous solution of the rare earth salt is introduced into the aqueous phosphoric acid solution under agitation. It is essential in order to control the particle diameter of the precipitated phosphate particles within the range from 1 to 10 µm suitable for use as the base material of phosphors for fluorescent lamps that introduction of the whole volume of the aqueous solution of the rare earth salt into the phosphoric acid solution, which is conducted at a substantially uniform rate, is completed within a length of time in the range from 3 seconds to 5 minutes. When the procedure of introduction of the rare earth salt solution is conducted too rapidly, too fine particles having a diameter smaller than 1 µm may be intermixed in the precipitates of the rare earth phosphate. When the procedure of introduction of the rare earth salt solution is conducted too slowly, too coarse particles having a diameter larger than 10 μm may be intermixed in the precipitates of the rare earth phosphate as a result of growth of the precipitated particles. In step (b) of the inventive method, the precipitated rare earth phosphate particles are collected from the aqueous slurry obtained in step (a) described above by a solid-liquid separating method such as filtration followed by washing with water and drying or calcination to give a rare earth phosphate powder consisting of particles having a particle diameter in the range from 1 to 10 μm. In the above described inventive method, it is absolutely unnecessary to control the pH value of the reaction mixture by using an alkaline compound such as ammonia water and the like in the course of the precipitation reaction and the pH of the reaction mixture is gradually decreased as a consequence of formation of a free acid by the reaction. Rather, addition of an alkaline compound to control the pH should not be undertaken because of the possible formation of too fine phosphate particles and agglomeration of primary particles.

The method of the present invention described above is applicable to the preparation of phosphate particles of any rare earth elements including yttrium and the elements having an atomic number of 57 to 71 inclusive expressed by the chemical formula $LnPO_4 \cdot zH_2O$, in which Ln is a rare earth element or a combination of the rare earth elements and z is zero or a positive number not exceeding 5. These rare earth elements can be used in combination of two kinds or more according to need. In particular, quite satisfactory results can be obtained by the inventive method when applied to the preparation of composite phosphate particles of a combination of rare earth elements including lanthanum, cerium and terbium as expressed by the formula $La_xCe_yTb_{(1-x-y)}PO_4 \cdot zH_2O$, in which x is a positive number in the range from 0.4 to 0.7, y is zero or a positive number with the proviso that x+y is in the range from 0.7 to 0.9 and z has the same meaning as defined above. The lanthanum-cerium-terbium mixed rare earth phosphate particles obtained by the inventive method are quite satisfactory as a base material for the preparation of a phosphor for fluorescent lamps of the 3-wavelength type.

In the following, the method of the present invention is described in more detail by way of examples and comparative examples, which, however, never limit the scope of the invention in any way.

EXAMPLE 1.

An aqueous mixed rare earth nitrate solution of lanthanum, cerium and terbium in a total rare earth concentration of 0.1 mole/liter with a lanthanum:cerium:terbium molar ratio of 5:4:1 was prepared and the concentration of free nitric acid therein was adjusted to 0.05 mole/liter. A 500 ml portion of this rare earth nitrate solution kept at 80° C. was introduced into 500 ml of an aqueous solution of phosphoric acid in a concentration of 0.3 mole/liter kept at 80° C. under agitation over a period of 20 seconds to precipitate rare earth phosphate particles which were immediately collected by filtration followed by washing with water and drying to give a mixed rare earth phosphate powder. The values of pH of the starting phosphoric acid solution, starting rare earth nitrate solution and the reaction mixture after completion of precipitation of the rare earth phosphate were 1.4, 1.3 and 0.8, respectively. The thus obtained rare earth phosphate particles were examined on a scanning electron microscope to give an electron microscopic photograph shown in FIG. 1 which indicates that the configuration of the particles is generally globular. The rare earth phosphate powder had a particle size distribution shown by the histogram of FIG. 3, from which the average particle diameter was calculated to be 3.21 μm.

EXAMPLE 2.

Particles of a composite rare earth phosphate were prepared in substantially the same manner as in Example 1 except that the aqueous solution of the mixed rare earth nitrates was introduced into the aqueous phosphoric acid solution over a period of 60 seconds. The thus obtained phosphate particles had a globular particle configuration similar to that in Example 1 and the average particle diameter thereof was 7.10 μm.

EXAMPLE 3.

Particles of a composite rare earth phosphate were prepared in substantially the same manner as in Example 1 except that the aqueous solution of the mixed rare earth nitrates was introduced into the aqueous phosphoric acid solution over a period of 3 minutes. The thus obtained phosphate particles had a globular particle configuration similar to that in Example 1 and the average particle diameter thereof was 9.76 μm.

EXAMPLE 4.

Particles of a composite rare earth phosphate were prepared in substantially the same manner as in Example 1 except that the molar ratio of the (lanthanum nitrate):(cerium nitrate):(terbium nitrate) was 6.5:2.0:1.5. The thus obtained phosphate particles had a globular particle configuration similar to that in Example 1 and the average particle diameter thereof was 3.05 μm.

EXAMPLE 5.

An aqueous mixed rare earth nitrate solution of yttrium and europium in a rare earth concentration of 0.2 mole/liter with a yttrium:europium molar ratio of 25:1 was prepared and a 200 ml portion of this rare earth nitrate solution kept at 70° C. was introduced into 800 ml of an aqueous solution of phosphoric acid in a concentration of 0.1 mole/liter kept at 70° C. under agitation over a period of 30 seconds to precipitate rare earth phosphate particles which were immediately collected by filtration followed by washing with water and calcination to give a composite rare earth phosphate powder. The thus obtained phosphate particles had a globular particle configuration similar to that in Example 1 and the average particle diameter thereof was 8.26 μm.

EXAMPLE 6.

An aqueous mixed rare earth nitrate solution of yttrium and europium in a rare earth concentration of 1.5 moles/liter with a trium:europium molar ratio of 25:1 was prepared and a 500 ml portion of this rare earth nitrate solution kept at 70° C. was introduced into 500 ml of an aqueous solution of phosphoric acid in a concentration of 3.0 moles/liter kept at 70° C. under agitation over a period of 30 seconds to precipitate rare earth phosphate particles which were immediately collected by filtration followed by washing with water and calcination to give a composite rare earth phosphate powder. The thus obtained phosphate particles had a globular particle configuration similar to that in Example 1 and the average particle diameter thereof was 9.51 μm.

EXAMPLE 7.

An aqueous solution of gadolinium nitrate in a rare earth concentration of 0.1 mole/liter was prepared and a 500 ml portion of this gadolinium nitrate solution kept at 80° C. was introduced into 500 ml of an aqueous solution of phosphoric acid in a concentration of 0.3 mole/liter kept at 80° C. under agitation over a period of 30 seconds to precipitate gadolinium phosphate particles which were immediately collected by filtration followed by washing with water and drying to give a gadolinium phosphate powder. The thus obtained phosphate particles had a globular particle configuration similar to that in Example 1 and the average particle diameter thereof was 7.19 μm.

Comparative Example 1.

Particles of a composite rare earth phosphate of lanthanum, cerium and terbium were prepared in substantially the same manner as in Example 1 except that the aqueous solution of the mixed rare earth nitrates was introduced into the aqueous phosphoric acid solution over a period of 2 seconds. The thus obtained phosphate particles had a globular particle configuration similar to that in Example 1 but the particles were very fine to have an average particle diameter of only 0.87 μm.

Comparative Example 2.

Particles of a composite rare earth phosphate were prepared in substantially the same manner as in Example 1 except that the aqueous solution of the mixed rare earth nitrates was introduced into the aqueous phosphoric acid solution over a period of 15 minutes. The thus obtained phosphate particles had a globular particle configuration similar to that in Example 1 but the particles were very coarse to have an average particle diameter of as large as 18.97 μm as is shown in the microscopic photograph of FIG. 2 and the histogram shown in FIG. 4.

What is claimed is:

1. A method for the preparation of a rare earth phosphate powder which comprises the steps of:

(a) adding a first aqueous solution of a salt of a rare earth element or an aqueous solution of salts of rare earth elements in combination into a second aqueous solution of phosphoric acid in which the amount of phosphoric acid is at least 150% by moles of the theoretical amount, based on the amount of the rare earth element in the first aqueous solution, said first aqueous solution being added to the second aqueous solution gradually over a time period ranging from 3 seconds to 5 minutes to form an aqueous slurry of particles of a rare earth phosphate or composite rare earth phosphate in an aqueous medium; and (b) separating the particles in the aqueous slurry from the aqueous medium.

2. The method for the preparation of a rare earth phosphate powder as claimed in claim 1 in which the concentration of the rare earth element or elements in the first aqueous solution is in the range from 0.01 mole/liter to 2 moles/liter.

3. The method for the preparation of a rare earth phosphate powder as claimed in claim 1 in which the concentration of phosphoric acid in the second aqueous solution is in the range from 0.01 mole/liter to 5 moles/liter.

4. The method for the preparation of a rare earth phosphate powder as claimed in claim 1 in which the temperature of each of the first and second aqueous solutions is in the range from 50° C. to 100 ° C.

* * * * *